United States Patent
Sun et al.

(10) Patent No.: US 8,608,329 B2
(45) Date of Patent: Dec. 17, 2013

(54) PHOSPHOR PLATE AND ILLUMINATION SYSTEM WITH THE SAME

(75) Inventors: Fu-Kuo Sun, Taoyuan Hsien (TW); Keh-Su Chang, Taoyuan Hsien (TW); Chien-Cheng Kuo, Taoyuan County (TW); Cheng-Chung Lee, Taoyuan County (TW)

(73) Assignees: Delta Electronics, Inc., Taoyuan Hsien (TW); National Central University, Taoyuan County (TW)

( * ) Notice: Subject to any disclaimer, the term of this patent is extended or adjusted under 35 U.S.C. 154(b) by 354 days.

(21) Appl. No.: 13/209,580

(22) Filed: Aug. 15, 2011

(65) Prior Publication Data

US 2012/0039065 A1  Feb. 16, 2012

Related U.S. Application Data

(60) Provisional application No. 61/373,970, filed on Aug. 16, 2010.

(51) Int. Cl.
*F21V 9/16* (2006.01)
*F21V 13/02* (2006.01)

(52) U.S. Cl.
USPC ............. 362/84; 362/260; 362/231; 348/759; 359/892

(58) Field of Classification Search
USPC ........ 362/19, 84, 231, 293; 348/759; 359/892
See application file for complete search history.

(56) References Cited

U.S. PATENT DOCUMENTS

2013/0088471 A1 * 4/2013 Kitano .......................... 345/208

FOREIGN PATENT DOCUMENTS

| CN | 1742382 | 3/2006 |
| CN | 1981216 | 6/2007 |
| CN | 1981220 | 6/2007 |
| CN | 101539270 | 9/2009 |

* cited by examiner

*Primary Examiner* — Joseph L Williams
(74) *Attorney, Agent, or Firm* — Kirton McConkie; Evan R. Witt (57) ABSTRACT

A phosphor plate includes a glass layer, a wide-angle reflection dichroic filter and a phosphor layer. The wide-angle reflection dichroic filter is disposed on an exit surface of the glass layer. A first blue light and a second blue light of the incident ray are transmissible through the wide-angle reflection dichroic filter. The phosphor layer is disposed beside the wide-angle reflection dichroic filter. By the phosphor layer, the first blue light is excited as a first green light to be outputted and the second blue light is reflected to the wide-angle reflection dichroic filter. The second blue light and a portion of the first green light outputted from the phosphor layer are reflected by the wide-angle reflection dichroic filter, so that the portion of the first green light is transmitted through the phosphor layer and the second blue light is excited as a second green light by the phosphor layer.

15 Claims, 13 Drawing Sheets

PHOSPHOR PLATE AND ILLUMINATION SYSTEM WITH THE SAME

CROSS-REFERENCE TO RELATED APPLICATION

This application claims the benefit of U.S. Provisional Application No. 61/373,970 filed on Aug. 16, 2010, and entitled "WIDE ANGLE REFLECTIVE DICHROIC FILTER", the entirety of which is hereby incorporated by reference.

FIELD OF THE INVENTION

The present invention relates to a phosphor plate, and more particularly to a phosphor plate using a wide-angle reflection dichroic filter to increase the luminous efficiency. The present invention also relates to an illumination system with such a phosphor plate.

BACKGROUND OF THE INVENTION

In recent years, a variety of projectors have been widely used in various video applications. By the projector, an image signal provided by an image signal source can be enlarged and shown on a projection screen. For reducing power consumption and having longer life, the illumination system of the current projector employs a solid-state light-emitting element (e.g. light emitting diode or laser diode) to replace the conventional high intensity discharge (HID) lamp.

Generally, the illumination system of the projector should emit three primary colors of light, i.e. red light (R), green light (G) and blue light (B). As for the luminous efficiency of the solid-state light-emitting element, the luminous efficiency of the blue solid-state light-emitting element is higher than the luminous efficiency of the red solid-state light-emitting element; and the luminous efficiency of each of the blue solid-state light-emitting element and the red solid-state light-emitting element is much higher than the luminous efficiency of the green solid-state light-emitting element. Since the green solid-state light-emitting element has poor luminous efficiency, the green light is produced by using a blue solid-state light-emitting element and a plate containing phosphor coating to excite blue light as green light. That is, in replace of the green blue solid-state light-emitting element, the uses of the blue solid-state light-emitting element and the plate containing phosphor coating may directly emit the green light. Consequently, the luminous efficiency of the whole illumination system is enhanced.

The conventional illumination system, however, still has some drawbacks. For example, during the process of using the phosphor plate to convert the incident ray, a portion of the incident ray is reflected by the phosphor plate. Under this circumstance, an energy loss problem occurs, and thus the luminous efficiency arising from conversion is largely reduced. For solving the energy loss problem from reflection, a reflective optical element is used in the illumination system for returning the reflected light back to the phosphor plate. Since the reflected light is further excited as green light by the phosphor plate, the energy loss will be reduced.

Figure 1A:
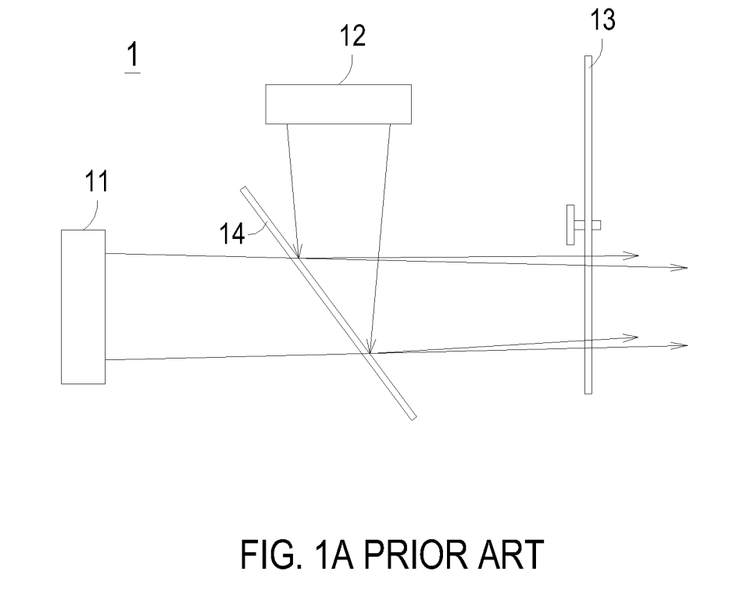
FIG. 1A schematically illustrates the architecture of a conventional illumination system.
Figure 1B:
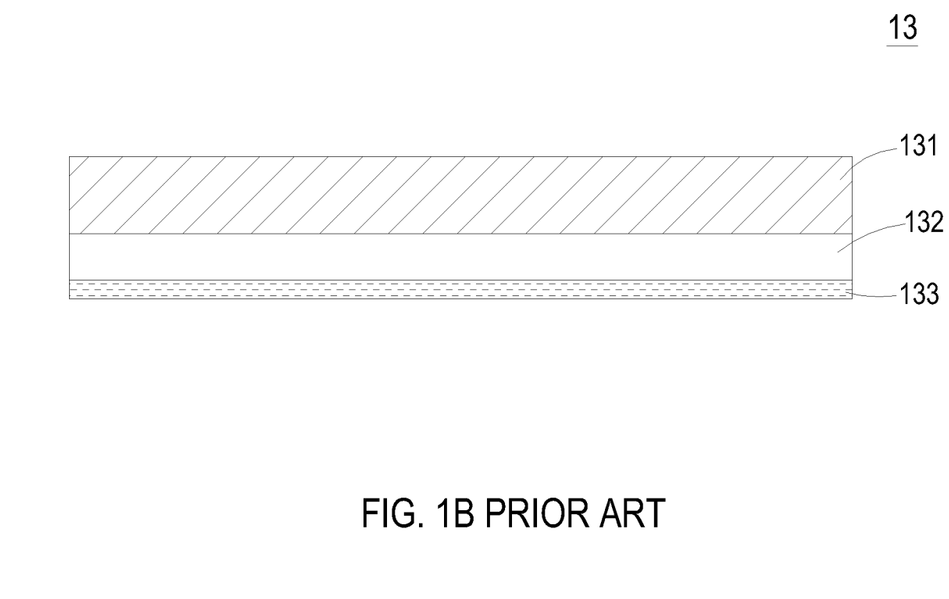
FIG. 1B schematically illustrates the configuration of a phosphor plate used in the conventional illumination system as shown in FIG. 1A.

FIG. 1A schematically illustrates the architecture of a conventional illumination system. FIG. 1B schematically illustrates the configuration of a phosphor plate used in the conventional illumination system as shown in FIG. 1A. The conventional illumination system 1 comprises a blue LED 11, a red LED 12, a phosphor plate 13 and a dichroic mirror 14. The dichroic mirror 14 is located between the blue LED 11 and the phosphor plate 13. The blue LED 11 is used for emitting blue light. The blue light is transmitted through the dichroic mirror 14 and directed to an optical path. The red LED 12 is used for emitting red light. The red light is reflected by the dichroic mirror 14 and directed to the optical path. The phosphor plate 13 is located at the optical path. In addition, the phosphor plate 13 comprises a phosphor layer 131, a glass layer 132 and a reflective optical element 133. The phosphor layer 131 is used for exciting the blue light and converting the blue light into green light to be outputted. A portion of the incident ray that is reflected by the phosphor layer 131 is reflected back to the phosphor layer 131 by the reflective optical element 133. Since the reflected light is further excited as green light by the phosphor layer 131, the energy loss will be reduced.

Although the conventional illumination system 1 is effective to solve the energy loss problem, there are still some drawbacks. For example, since the reflective optical element 133 is disposed on the incident surface of the glass layer 132, if the incident ray with a large incident angle (e.g. greater than 42 degree) is excited and reflected by the phosphor layer 131 or reflected within the glass layer 132, the incident ray is readily subject to total internal reflection. Under this circumstance, a standing-wave effect is generated and a light leakage problem occurs. Consequently, the luminous efficiency is largely reduced.

Figure 1C:
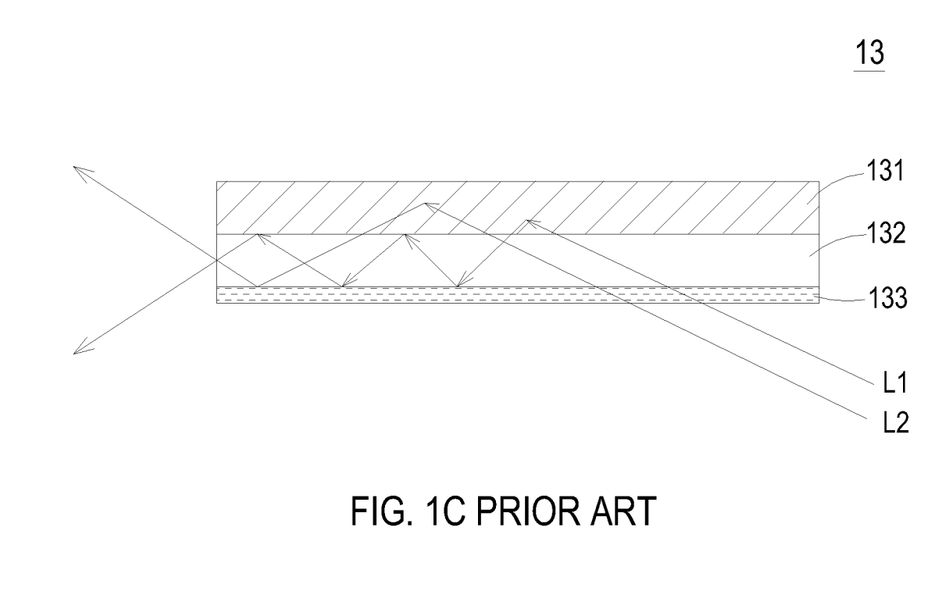
FIG. 1C schematically illustrates the occurrence of a light leakage problem in the situation that a incident ray with a large incident angle is excited and reflected by the phosphor layer of the phosphor plate.

FIG. 1C schematically illustrates the occurrence of a light leakage problem in the situation that a incident ray with a large incident angle is excited and reflected by the phosphor layer of the phosphor plate. As shown in FIG. 1C, after the incident rays L1 and L2 are transmitted through the incident surfaces of the reflective optical element 133 and the glass layer 132 to be introduced into the phosphor plate 13, the incident ray L1 is reflected by the phosphor layer 131, reflected within the glass layer 132 and then reflected by the reflective optical element 133. Since the incident angle of the incident ray L1 is very large and the distance between the reflective optical element 133 and the phosphor layer 131 is far, the optical path length of the incident ray L1 is too long. In addition, since the incident ray L1 is reflected by the phosphor layer 131, reflected within the glass layer 132 and then reflected by the reflective optical element 133, the incident ray L1 fails to be effectively excited by the phosphor layer 131. As the incident ray L1 is alternately reflected by the phosphor layer 131 and the reflective optical element 133, the incident ray L1 escapes from the edge of the glass layer 132, and thus the light leakage problem occurs. On the other hand, a portion of the incident ray L2 is excited as green light by the phosphor layer 131. Since the green light generated by the phosphor layer 131 is outputted in a full-angle scattering manner, a portion of the green light has a large incident angle and is directed to the glass layer 132 and the reflective optical element 133. Since the incident angle of the green light is large, a portion of the green light may escapes from the edge of the glass layer 132 according to the above-mentioned principles. Under this circumstance, the light leakage problem also occurs, and thus the luminous efficiency fails to be enhanced.

SUMMARY OF THE INVENTION

The present invention provides a phosphor plate and an illumination system with such a phosphor plate, in which the phosphor plate utilizes a wide-angle reflection dichroic filter to increase the luminous efficiency. In such way, the drawbacks of the conventional phosphor plate (e.g. the energy loss, the standing-wave effect and the light leakage problem) will be eliminated.

The present invention also provides a phosphor plate and an illumination system with such a phosphor plate. In the phosphor plate, the wide-angle reflection dichroic filter is disposed on the exit surface of the glass layer. By the wide-angle reflection dichroic filter, the light reflected by the phosphor layer is returned back to the phosphor layer to be excited again. Since the incident ray with a large incident angle can be effectively reflected back to the phosphor layer to be excited, the energy loss problem will be avoided and the luminous efficiency will be enhanced.

In accordance with an aspect of the present invention, there is provided a phosphor plate. The phosphor plate includes a glass layer, a wide-angle reflection dichroic filter and a phosphor layer. The glass layer has an exit surface, and a first color light in a first waveband region is transmissible through the glass layer. The wide-angle reflection dichroic filter is disposed on the exit surface of the glass layer, wherein a first light beam and a second light beam of the first color light are transmissible through the wide-angle reflection dichroic filter. The phosphor layer is disposed beside the wide-angle reflection dichroic filter. By the phosphor layer, the first light beam of the first color light is excited as a first light beam of a second color light in a second waveband region to be outputted and the second light beam of the first color light is reflected to the wide-angle reflection dichroic filter. The second light beam of the first color light and a portion of the first light beam of the second color light outputted from the phosphor layer are reflected by the wide-angle reflection dichroic filter, so that the portion of the first light beam of the second color light is transmitted through the phosphor layer and the second light beam of the first color light is excited as a second light beam of the second color light by the phosphor layer so as to be outputted.

In accordance with another aspect of the present invention, there is provided an illumination system. The illumination system comprises a solid-state light-emitting element and a phosphor plate. The solid-state light-emitting element is used for emitting a first color light in a first waveband region to an optical path. The phosphor plate is located at the optical path and comprises a glass layer, a wide-angle reflection dichroic filter and a phosphor layer. The glass layer has an exit surface, and the first color light is transmissible through the glass layer. The wide-angle reflection dichroic filter is disposed on the exit surface of the glass layer, wherein a first light beam and a second light beam of the first color light are transmissible through the wide-angle reflection dichroic filter. The phosphor layer is disposed beside the wide-angle reflection dichroic filter. By the phosphor layer, the first light beam of the first color light is excited as a first light beam of a second color light in a second waveband region to be outputted and the second light beam of the first color light is reflected to the wide-angle reflection dichroic filter. The second light beam of the first color light and a portion of the first light beam of the second color light outputted from the phosphor layer are reflected by the wide-angle reflection dichroic filter, so that the portion of the first light beam of the second color light is transmitted through the phosphor layer and the second light beam of the first color light is excited as a second light beam of the second color light by the phosphor layer so as to be outputted.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
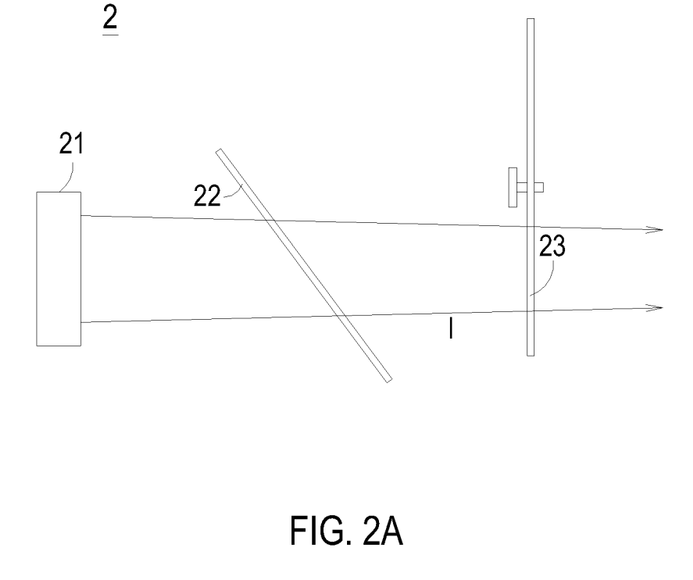
FIG. 2A schematically illustrates the architecture of an illumination system according to an embodiment of the present invention.
Figure 2B:
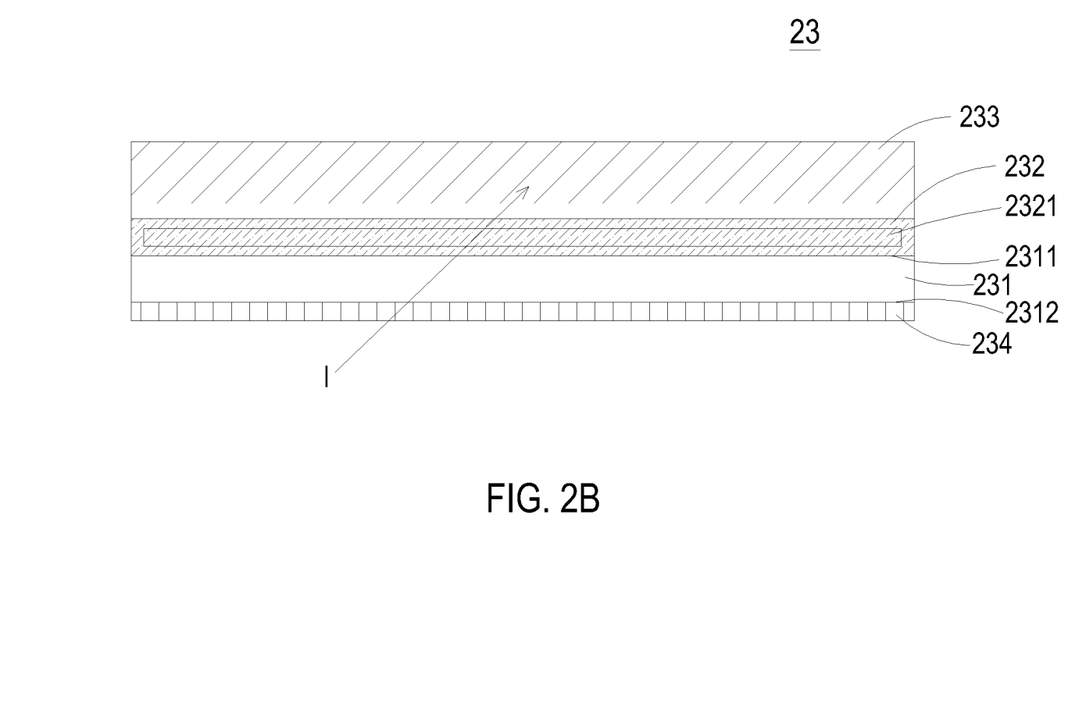
FIG. 2B schematically illustrates the configuration of an exemplary phosphor plate used in the illumination system as shown in FIG. 2A.
Figure 2C:
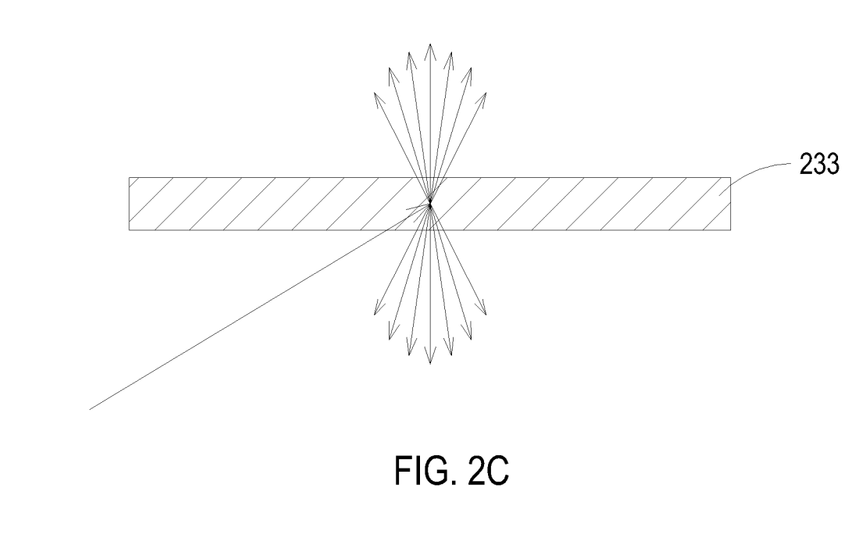
FIGS. 2C and 2D schematically illustrate the light generated by the phosphor layer of the phosphor plate as shown in FIG. 2B.
Figure 2D:
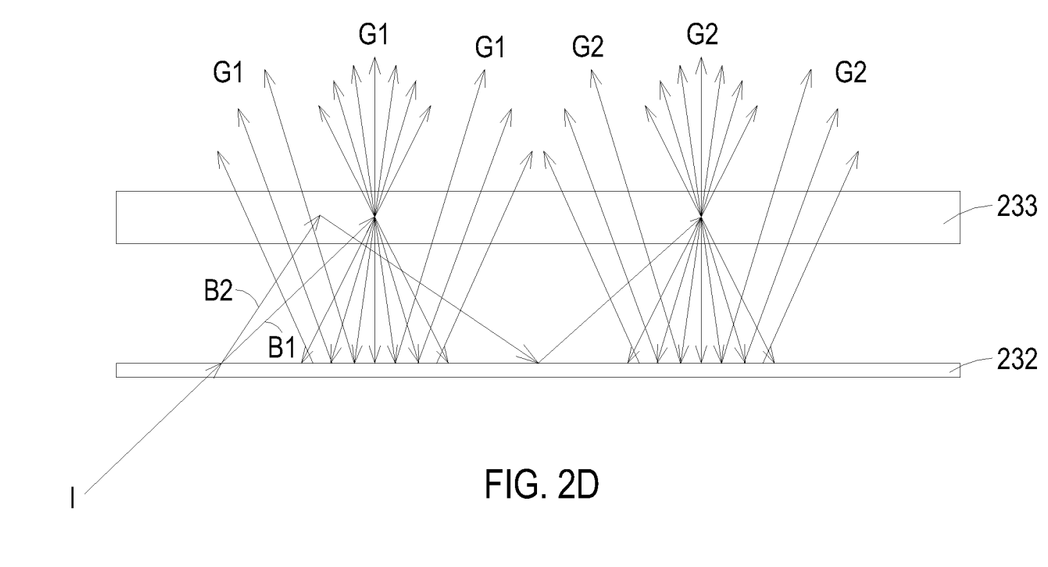

FIG. 2A schematically illustrates the architecture of an illumination system according to an embodiment of the present invention. FIG. 2B schematically illustrates the configuration of an exemplary phosphor plate used in the illumination system as shown in FIG. 2A. FIGS. 2C and 2D schematically illustrate the light generated by the phosphor layer of the phosphor plate as shown in FIG. 2B.

Please refer to FIGS. 2A-2D. The phosphor plate 23 of the present invention is applied to an illumination system 2. The illumination system 2 comprises a solid-state light-emitting element 21, a dichroic mirror 22 and a phosphor plate 23. The solid-state light-emitting element 21 is configured for emitting a first color light in a first waveband region I (i.e. an incident ray) to an optical path. The solid-state light-emitting element 21 is for example a light emitting diode or a laser diode, and preferably a light emitting diode. An example of the solid-state light-emitting element 21 includes but is not limited to a blue light emitting diode. The dichroic mirror 22 is located between the solid-state light-emitting element 21 and the phosphor plate 23. The incident first color light I is transmissible through the dichroic mirror 22 and directed to an optical path. Consequently, the first color light I can be incident to the phosphor plate 23 to be excited.

In this embodiment, the phosphor plate 23 is located at the optical path and comprises a glass layer 231, a wide-angle reflection dichroic filter 232 and a phosphor layer 233. The glass layer 231 has an exit surface 2311 and an incident surface 2312. The first color light I is transmissible through the glass layer 231. That is, the first color light I is incident into the glass layer 231 through the incident surface 2312 and exited out of the wide-angle reflection dichroic filter 232 from the exit surface 2311. The wide-angle reflection dichroic filter 232 is disposed on the exit surface 2311 of the glass layer 231. The phosphor layer 233 is disposed beside the wide-angle reflection dichroic filter 232. Moreover, the wide-angle reflection dichroic filter 232 has a light-filtering function, so that the light with specified color or wavelength is transmitted through the wide-angle reflection dichroic filter 232.

In this embodiment, a first light beam B1 (i.e. a first blue light) and a second light beam B2 (i.e. a second blue light) of the first color light I are transmitted through the wide-angle reflection dichroic filter 232 to be excited by the phosphor layer 233. Due to the characteristics of the phosphor layer 233, the light generated by the phosphor layer 233 is outputted in a full-angle scattering manner (see FIG. 2C). By the phosphor layer 233, the first blue light B1 is excited as a first light beam G1 (i.e. a first green light) of a second color light in a second waveband region to be outputted. The first green light G1 is outputted in a full-angle scattering manner. A portion of the first green light G1 is backwardly scattered toward the wide-angle reflection dichroic filter 232. In addition, the second blue light B2 is reflected to the wide-angle reflection dichroic filter 232 by the phosphor layer 233. After the portion of the first green light G1 outputted from the phosphor layer 233 and the second blue light B2 reflected by the phosphor layer 233 are directed to the wide-angle reflection dichroic filter 232, the portion of the first green light G1 is reflected by the wide-angle reflection dichroic filter 232 and then transmitted through the phosphor layer 233, and the second blue light B2 is reflected to the phosphor layer 233 by the wide-angle reflection dichroic filter 232 and then excited as a second light beam G2 (i.e. a second green light) of the second color light in the second waveband region by the phosphor layer 233 to be outputted (see FIG. 2D). That is, since the wide-angle reflection dichroic filter 232 is disposed on the exit surface 2311 of the glass layer 231, the light reflected by the phosphor layer 233 can be reflected back to the phosphor layer 233 by the wide-angle reflection dichroic filter 232, and then excited by the phosphor layer 233. Moreover, since the wide-angle reflection dichroic filter 232 is disposed beside the phosphor layer 233, the optical path length of the incident ray with a large incident angle is not too long. Consequently, the light can be effectively reflected back to the phosphor layer 233 to be excited. Under this circumstance, the energy loss is reduced, and the luminous efficiency is largely enhanced.

Figure 3A:
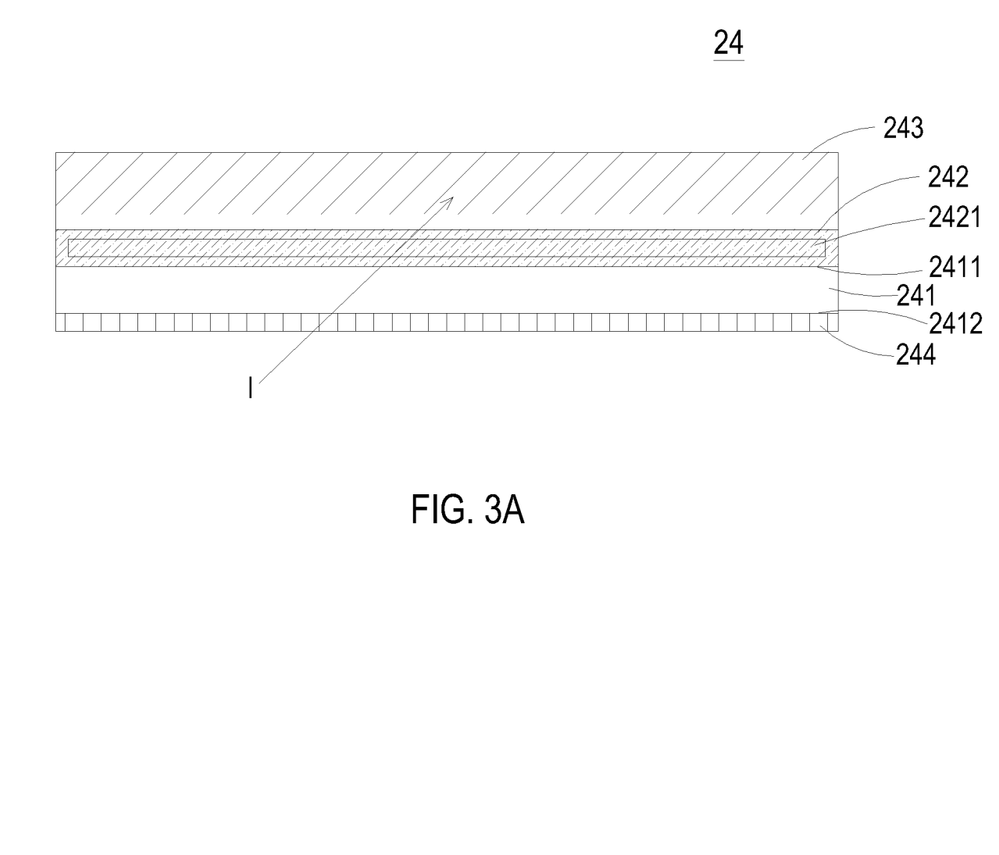
FIG. 3A schematically illustrates the configuration of another exemplary phosphor plate used in the illumination system of the present invention.
Figure 3B:
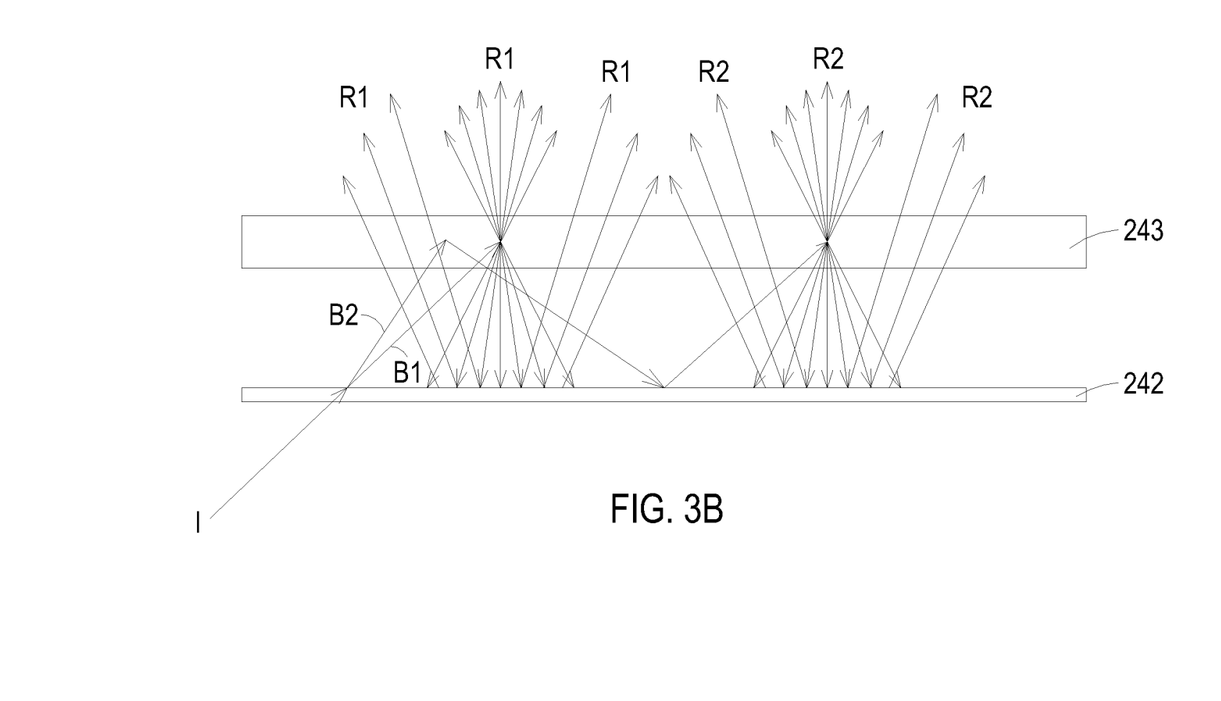
FIG. 3B schematically illustrates the light generated by the phosphor layer of the phosphor plate as shown in FIG. 3A.

FIG. 3A schematically illustrates the configuration of another exemplary phosphor plate used in the illumination system of the present invention. FIG. 3B schematically illustrates the light generated by the phosphor layer of the phosphor plate as shown in FIG. 3A. As shown in FIGS. 3A and 3B, the phosphor plat 24 is used for exciting a first color light in a first waveband region (i.e. blue light) as a second color light in a second waveband region (i.e. red light). In this embodiment, the phosphor plat 24 comprises a glass layer 241, a wide-angle reflection dichroic filter 242 and a phosphor layer 243. The glass layer 241 has an exit surface 2411 and an incident surface 2412. The first color light I is transmissible through the glass layer 241. That is, the first color light I is incident into the glass layer 241 through the incident surface 2412 and exited out of the wide-angle reflection dichroic filter 242 from the exit surface 2411. The wide-angle reflection dichroic filter 242 is disposed on the exit surface 2411 of the glass layer 241. The phosphor layer 243 is disposed beside the wide-angle reflection dichroic filter 242. Moreover, the wide-angle reflection dichroic filter 242 has a light-filtering function, so that the light with specified color or wavelength is transmitted through the wide-angle reflection dichroic filter 242.

In this embodiment, a first light beam B1 (i.e. a first blue light) and a second light beam B2 (i.e. a second blue light) of the first color light I are transmissible through the wide-angle reflection dichroic filter 242 to be excited by the phosphor layer 243, so that second color light is outputted from the phosphor layer 243. Except that a first light beam R1 (i.e. a first red light) and a second light beam R2 (i.e. a second red light) are outputted, the operating principles of the phosphor plat 24 are similar to those of the phosphor plat 23, and are not redundantly described herein. Since the wide-angle reflection dichroic filter 242 is disposed on the exit surface 2411 of the glass layer 241, the light reflected by the phosphor layer 243 can be reflected back to the phosphor layer 243 by the wide-angle reflection dichroic filter 242, and then excited by the phosphor layer 243. Moreover, since the wide-angle reflection dichroic filter 242 is disposed beside the phosphor layer 243, the optical path length of the incident ray with a large incident angle is not too long. Consequently, the light can be effectively reflected back to the phosphor layer 243 to be excited. Under this circumstance, the energy loss is reduced, and the luminous efficiency is largely enhanced.

Please refer to FIG. 2B again. In some embodiments, the phosphor plat 23 further comprises an anti-reflection filter 234, which is disposed on the incident surface 2312 of the glass layer 231. Similarly, as shown in FIG. 3A, the phosphor plat 24 further comprises an anti-reflection filter 244, which is disposed on the incident surface 2412 of the glass layer 241. For example, the anti-reflection filters 234 and 244 are thin films coated on the incident surfaces 2312 and 2412 of the glass layers 231 and 241, respectively. By means of the anti-reflection filters 234 and 244, the transmittance of the first color light I will be increased, and the surface reflectively of the glass layers 231 and 241 will be reduced. Consequently, the illumination system 2 with the phosphor plate 23 or 24 has better luminous efficiency.

Figure 3C:
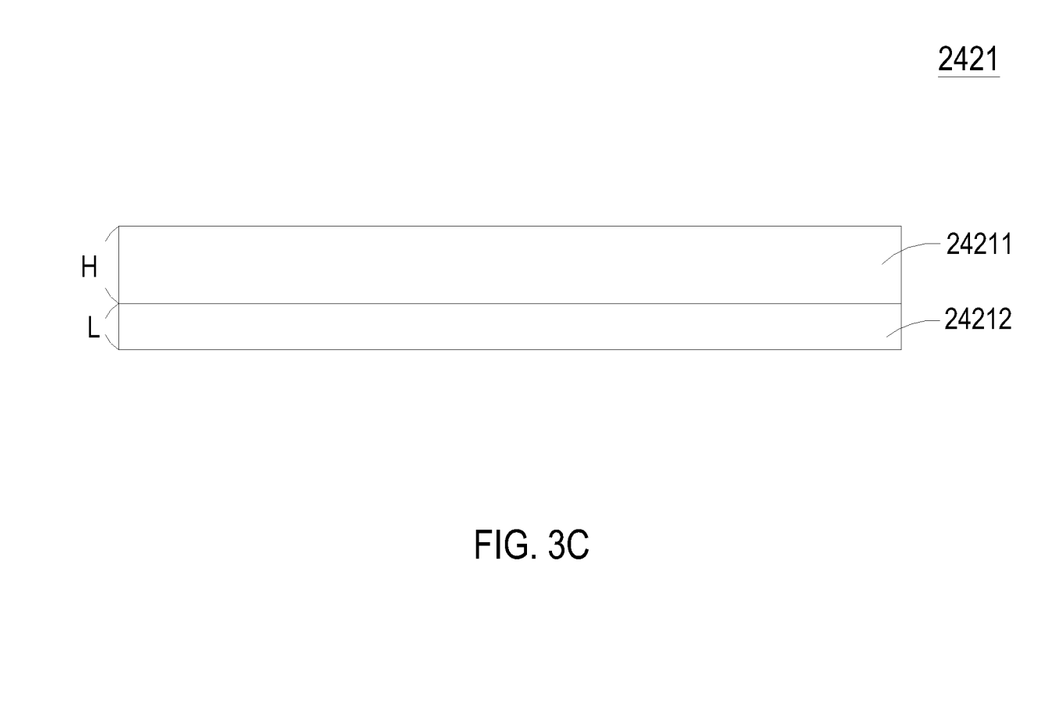
FIG. 3C schematically illustrates an angle-selective filter of the phosphor plate as shown in FIG. 3A.

In some embodiments, the phosphor plate 23 further comprises an angle-selective filter 2321, and the phosphor plate 24 further comprises an angle-selective filter 2421. The angle-selective filters 2321, 2421 are configured for increasing the optical transmittance of the wide-angle reflection dichroic filters 232, 242. The angle-selective filters 2321 and 2421 are respectively disposed within the wide-angle reflection dichroic filters 232 and 242 or respectively disposed on one side of the phosphor plates 23, 24 opposite to the wide-angle reflection dichroic filters 232, 242 (not shown) by an electron beam gun evaporation system and/or an ion-assisted deposition system. FIG. 3C schematically illustrates an angle-selective filter of the phosphor plate as shown in FIG. 3A. The angle-selective filter 242 comprises a high refractive index layer 24211 of a thickness H and a low refractive index layer 24212 of a thickness L. The angle-selective filter 242 complies with the $aH(aHbL)^{12}$ filter deign. Experiments demonstrate that if the coefficient "a/b" is 4, 2, 1, 0.5 or 0.25, the angle-selective filter can provide good anti-reflection, increase the luminous throughput and limit the luminance angle. Preferably, the coefficient "a/b" is 0.25, and it is not limited thereto. The light of a small incident angle can be easily transmitted through the angle-selective filter. In addition, the light of a large incident angle can be recycled. Consequently, the luminous efficiency of the illumination system is enhanced, and the emission direction is tailored.

Figure 4A:
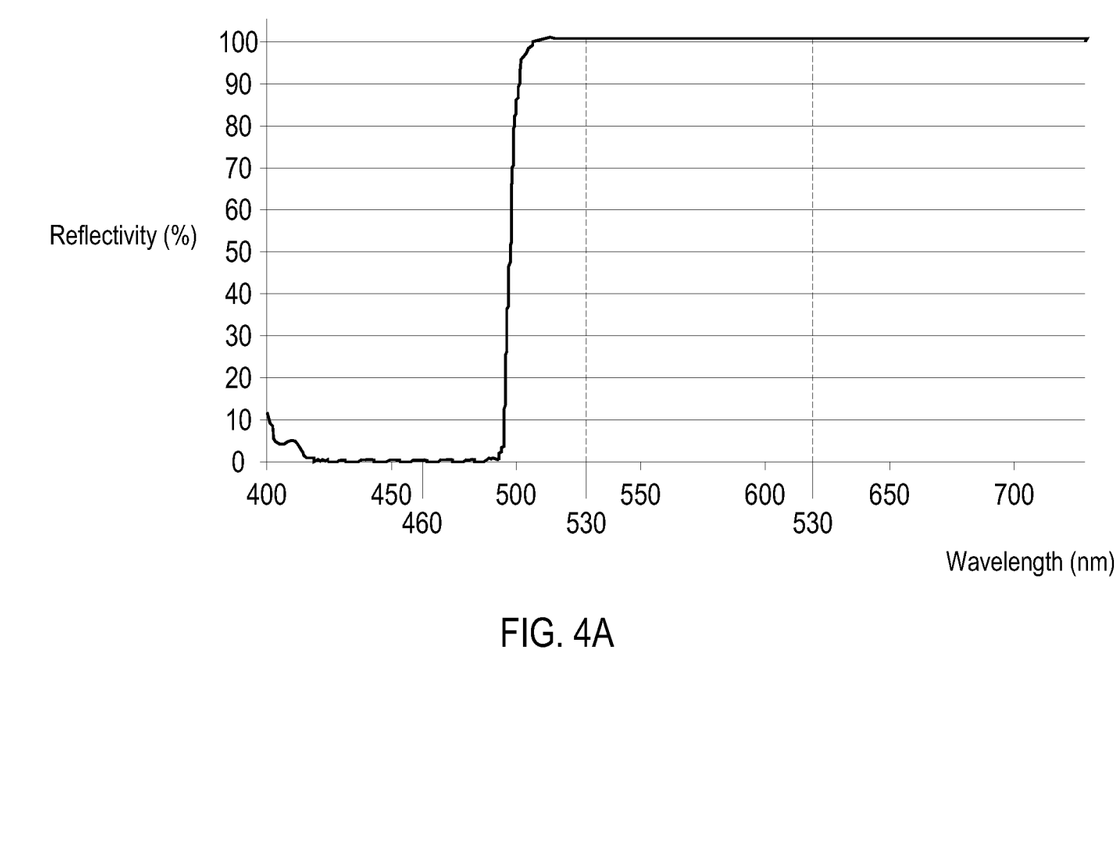
FIG. 4A is a plot illustrating the relationship between the reflectivity and the wavelength of the incident ray for the wide-angle reflection dichroic filter of the phosphor plate of the present invention.

FIG. 4A is a plot illustrating the relationship between the reflectivity and the wavelength of the incident ray for the wide-angle reflection dichroic filter of the phosphor plate of the present invention. As shown in FIG. 4A, if the wavelength of the incident ray is in the range between 420 nm and 480 nm, the reflectivity of the wide-angle reflection dichroic filter 232 or 242 (see FIG. 2B or 3A) is about 0%; and if the wavelength of the incident ray is greater than 480 nm, the reflectivity of the wide-angle reflection dichroic filter is about 100%. That is, the light with a wavelength in the range between 420 nm and 480 nm is completely transmitted through the wide-angle reflection dichroic filter, but the light with a wavelength greater than 480 nm is completely reflected by the wide-angle reflection dichroic filter. In this embodiment, the blue light (with a wavelength of about 460 nm) is completely transmissible through the wide-angle reflection dichroic filter 232 or 242, but the red light (with a wavelength of about 620 nm) and the green light (with a wavelength of about 530 nm) are completely reflected by the wide-angle reflection dichroic filter 232 or 242. In such way, the phosphor layers 233 and 243 have better luminous efficiency.

Figure 4B:
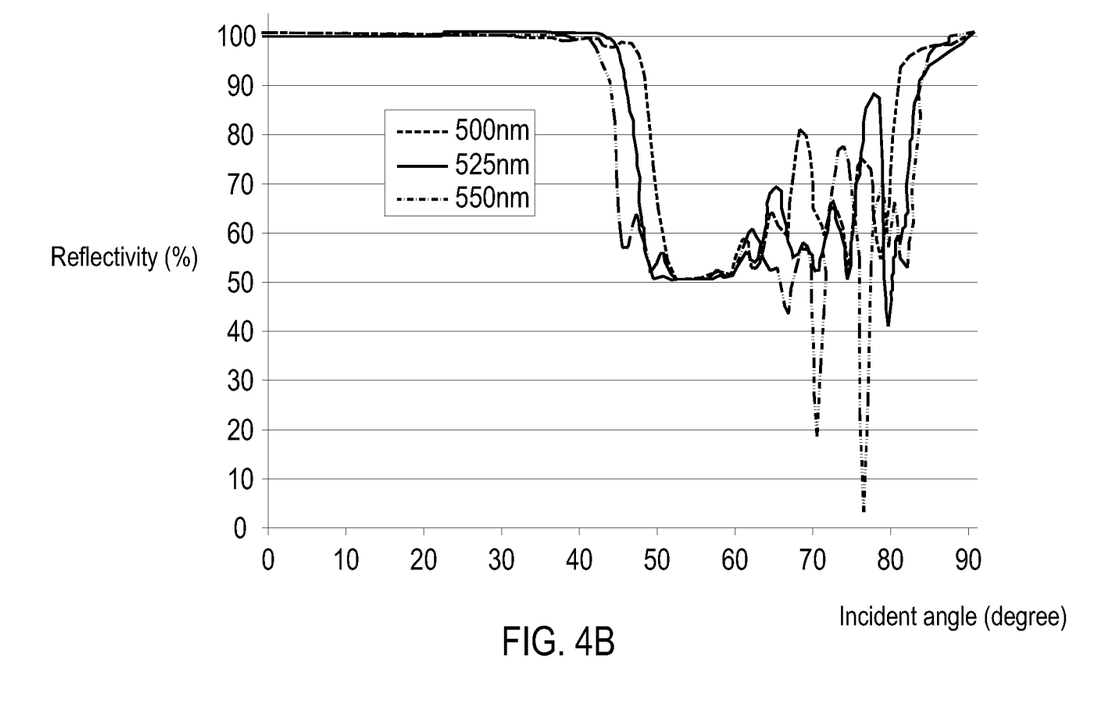
FIG. 4B is a plot illustrating the relationship between the reflectivity and the incident angle of the green light relative to the glass layer of the phosphor plate of the present invention.

FIG. 4B is a plot illustrating the relationship between the reflectivity and the incident angle of the green light relative to the glass layer of the phosphor plate of the present invention. When the first green light G1 and the second green light G2 generated by the phosphor layer 233 or 243 (see FIG. 2D or 3B) are directed to the wide-angle reflection dichroic filter 232 or 242, the first green light G1 and the second green light G2 with an incident angle smaller than 42 degrees relative to the glass layer 231 or 241 are completely reflected by the wide-angle reflection dichroic filter 232 or 242 (see FIG. 4B). Whereas, the first green light G1 and the second green light G2 with an incident angle greater than 42 degrees still have high reflectivity (>50%). In comparison with the conventional reflective optical element, the wide-angle reflection dichroic filter of the present invention has higher reflectivity, and thus the illumination system of the present invention has enhanced luminous efficiency.

Figure 4C:
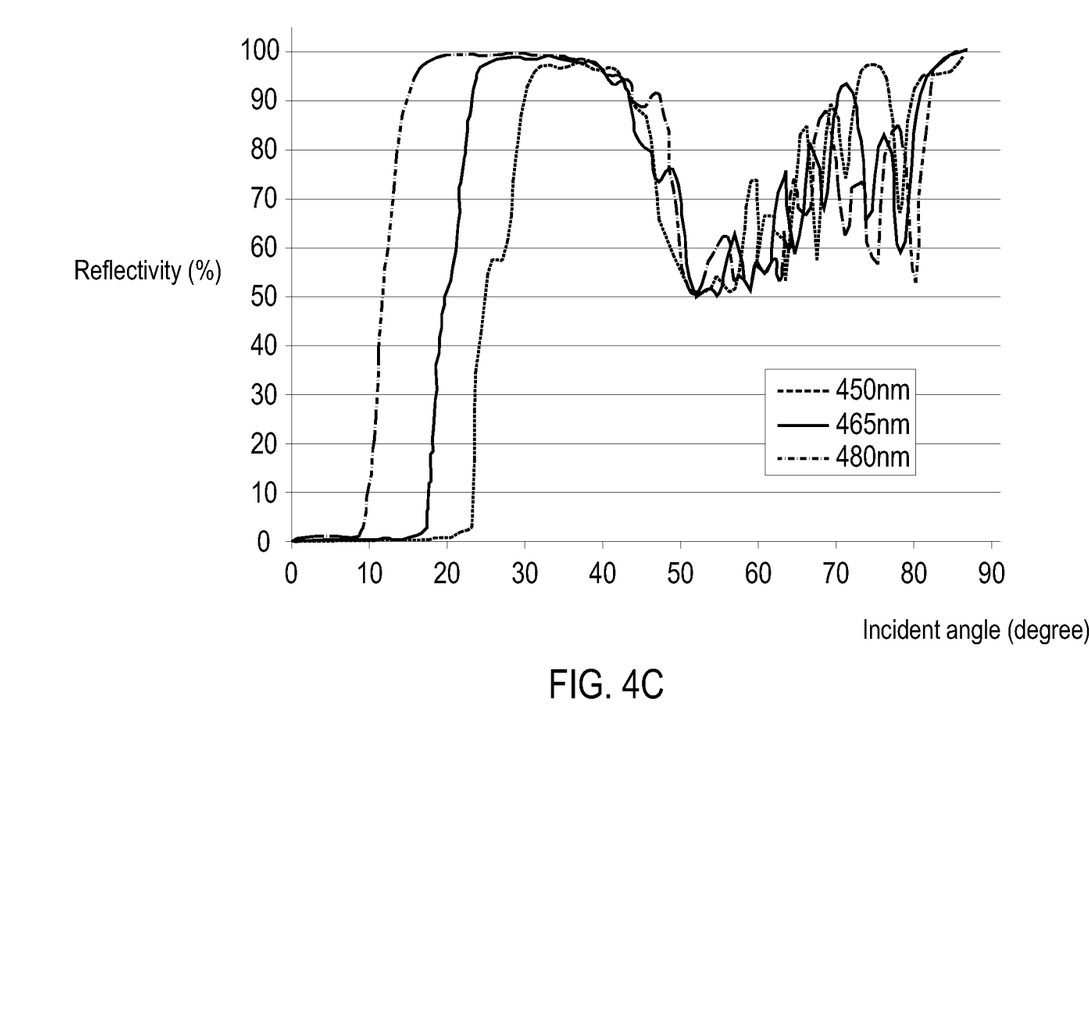
FIG. 4C is a plot illustrating the relationship between the reflectivity and the incident angle of the blue light relative to the glass layer of the phosphor plate of the present invention.

FIG. 4C is a plot illustrating the relationship between the reflectivity and the incident angle of the blue light relative to the glass layer of the phosphor plate of the present invention. When the second blue light B2 reflected by the phosphor layer 233 or 243 (see FIG. 2D or 3B) is directed to the wide-angle reflection dichroic filter 232 or 242, the second blue light B2 with an incident angle of 15~42 degrees relative to the glass layer 231 or 241 are almost completely reflected by the wide-angle reflection dichroic filter 232 or 242 (see FIG. 4C). Whereas, the second blue light B2 with an incident angle greater than 42 degrees still have high reflectivity (>50%). Consequently, the second blue light B2 can be reflected back to the phosphor layer 233 or 243 and excited by the phosphor layer 233 or 243 to be outputted. In comparison with the conventional reflective optical element, the wide-angle reflection dichroic filter of the present invention has higher reflectivity, and thus the illumination system of the present invention has enhanced luminous efficiency.

From the above description, the present invention provides a phosphor plate and an illumination system with such a phosphor plate. Since the wide-angle reflection dichroic filter is disposed on the exit surface of the glass layer, the light reflected by the phosphor layer can be reflected back to the phosphor layer by the wide-angle reflection dichroic filter, and then excited by the phosphor layer. Moreover, since the wide-angle reflection dichroic filter is disposed beside the phosphor layer, the optical path length of the incident ray with a large incident angle is not too long. Consequently, the light can be effectively reflected back to the phosphor layer to be excited. Under this circumstance, the energy loss is reduced, and the luminous efficiency is largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor plate, comprising:
a glass layer with an exit surface, wherein a first color light in a first waveband region is transmissible through said glass layer;
a wide-angle reflection dichroic filter disposed on said exit surface of said glass layer, wherein a first light beam and a second light beam of said first color light are transmissible through said wide-angle reflection dichroic filter; and
a phosphor layer disposed beside said wide-angle reflection dichroic filter, wherein by said phosphor layer, said first light beam of said first color light is excited as a first light beam of a second color light in a second waveband region to be outputted and said second light beam of said first color light is reflected to said wide-angle reflection dichroic filter,
wherein said second light beam of said first color light and a portion of said first light beam of said second color light outputted from said phosphor layer are reflected by said wide-angle reflection dichroic filter, so that said portion of said first light beam of said second color light is transmitted through said phosphor layer and said second light beam of said first color light is excited as a second light beam of said second color light by said phosphor layer so as to be outputted.

2. The phosphor plate according to claim 1 wherein said first color light in said first waveband region is blue light, and said second color light in said second waveband region is green light.

3. The phosphor plate according to claim 1 wherein said first color light in said first waveband region is blue light, and said second color light in said second waveband region is red light.

4. The phosphor plate according to claim 1 further comprising an anti-reflection filter, which is disposed on an incident surface of said glass layer for reducing a surface reflectivity of said glass layer and increasing a transmittance of said first color light.

5. The phosphor plate according to claim 1, further comprising an angle-selective filter for increasing an optical transmittance of said wide-angle reflection dichroic filter.

6. The phosphor plate according to claim 5 wherein said angle-selective filter is disposed within said wide-angle reflection dichroic filter or disposed on one side of said phosphor plate opposite to said wide-angle reflection dichroic filter by using an electron beam gun evaporation system or an ion-assisted deposition system.

7. The phosphor plate according to claim 6 wherein said angle-selective filter comprises a high refractive index layer with a thickness H and a low refractive index layer with a thickness L, and said angle-selective filter complies with the aH(aHbL)$^{12}$ filter deign, wherein the coefficient a/b is 4, 2, 1, 0.5 or 0.25.

8. An illumination system, comprising:
a solid-state light-emitting element for emitting a first color light in a first waveband region to an optical path; and
a phosphor plate located at said optical path and comprising:
  a glass layer with an exit surface, wherein said first color light is transmissible through said glass layer;
  a wide-angle reflection dichroic filter disposed on said exit surface of said glass layer, wherein a first light beam and a second light beam of said first color light are transmissible through said wide-angle reflection dichroic filter; and
  a phosphor layer disposed beside said wide-angle reflection dichroic filter, wherein by said phosphor layer, said first light beam of said first color light is excited as a first light beam of a second color light in a second waveband region to be outputted and said second light beam of said first color light is reflected to said wide-angle reflection dichroic filter,
  wherein said second light beam of said first color light and a portion of said first light beam of said second color light outputted from said phosphor layer are reflected by said wide-angle reflection dichroic filter, so that said portion of said first light beam of said second color light is transmitted through said phosphor layer and said second light beam of said first color light is excited as a second light beam of said second color light by said phosphor layer so as to be outputted.

9. The illumination system according to claim 8 wherein said solid-state light-emitting element is a light emitting diode or a laser diode.

10. The illumination system according to claim 8 wherein said first color light in said first waveband region is blue light, and said second color light in said second waveband region is green light.

11. The illumination system according to claim 8 wherein said first color light in said first waveband region is blue light, and said second color light in said second waveband region is red light.

12. The illumination system according to claim 8 wherein said phosphor plate further comprises an anti-reflection filter, which is disposed on an incident surface of said glass layer for reducing a surface reflectivity of said glass layer and increasing a transmittance of said first color light.

13. The illumination system according to claim 8, further comprises an angle-selective filter for increasing an optical transmittance of said wide-angle reflection dichroic filter.

14. The illumination system according to claim 13 wherein said angle-selective filter is disposed within said wide-angle reflection dichroic filter or disposed on one side of said phosphor plate opposite to said wide-angle reflection dichroic filter by using an electron beam gun evaporation system or an ion-assisted deposition system.

15. The illumination system according to claim 14 wherein said angle-selective filter comprises a high refractive index layer with a thickness H and a low refractive index layer with a thickness L, and said angle-selective filter complies with the aH(aHbL)$^{12}$ filter deign, wherein the coefficient a/b is 4, 2, 1, 0.5 or 0.25.

* * * * *